(12) United States Patent
Engewald et al.

(10) Patent No.: US 11,460,539 B2
(45) Date of Patent: Oct. 4, 2022

(54) METHOD AND DEVICE FOR OPERATING MULTIPLE SENSORS OF A VEHICLE

(71) Applicant: Robert Bosch GmbH, Stuttgart (DE)

(72) Inventors: Stefan Engewald, Osterburken (DE); Michael Schoor, Stuttgart (DE); Stefan Heilmann, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 251 days.

(21) Appl. No.: 16/958,464

(22) PCT Filed: Nov. 30, 2018

(86) PCT No.: PCT/EP2018/083110
§ 371 (c)(1),
(2) Date: Jun. 26, 2020

(87) PCT Pub. No.: WO2019/145072
PCT Pub. Date: Aug. 1, 2019

(65) Prior Publication Data
US 2021/0055413 A1 Feb. 25, 2021

(30) Foreign Application Priority Data
Jan. 29, 2018 (DE) .......................... 102018201303.9

(51) Int. Cl.
*G01S 13/58* (2006.01)
*G01S 7/35* (2006.01)
(Continued)

(52) U.S. Cl.
CPC ................ *G01S 7/35* (2013.01); *G01S 7/023* (2013.01); *G01S 7/0232* (2021.05);
(Continued)

(58) Field of Classification Search
CPC ...... G01S 13/343; G01S 13/582; G01S 13/87; G01S 13/931; G01S 15/34; G01S 15/87;
(Continued)

(56) References Cited

U.S. PATENT DOCUMENTS

| 5,345,470 A | 9/1994 | Alexander |
| 2014/0197983 A1* | 7/2014 | Reuter .................. G01S 13/347 342/175 |

(Continued)

FOREIGN PATENT DOCUMENTS

| DE | 102013200404 A1 | 7/2014 |
| DE | 102013210256 A1 | 12/2014 |

(Continued)

OTHER PUBLICATIONS

International Search Report for PCT/EP2018/083110, dated Feb. 4, 2019.

*Primary Examiner* — Timothy A Brainard
(74) *Attorney, Agent, or Firm* — Norton Rose Fulbright US LLP; Gerard Messina (57) ABSTRACT

A method for operating multiple sensors of a vehicle in at least partially spatially coinciding detection areas and in a shared frequency domain. In the method, at a transmission point in time, at least two sensors transmit simultaneously on separate instantaneous frequencies separated by a frequency gap, the frequency gap including at least one instantaneous receive bandwidth of the sensors, each instantaneous frequency being blocked for a use by the sensors after the transmission point in time for the duration of a time gap, the time gap including at least one signal propagation time across a reception range of the sensors.

11 Claims, 3 Drawing Sheets

(51) Int. Cl.
*H04W 4/46* (2018.01)
*G01S 13/931* (2020.01)
*H04B 1/04* (2006.01)
*G01S 7/02* (2006.01)

(52) U.S. Cl.
CPC .......... *G01S 13/582* (2013.01); *G01S 13/931* (2013.01); *H04B 1/0483* (2013.01); *H04W 4/46* (2018.02); *G01S 2013/9316* (2020.01); *G01S 2013/9325* (2013.01)

(58) Field of Classification Search
CPC ........ G01S 15/931; G01S 17/34; G01S 17/87; G01S 17/931; G01S 2013/9316; G01S 2013/9323; G01S 2013/9324; G01S 2013/9325; G01S 2013/93271; G01S 2013/93272; G01S 2013/93274; G01S 7/023; G01S 7/0232; G01S 7/35; G01S 7/4911; G01S 7/534; H04B 1/0483; H04W 4/46
See application file for complete search history.

(56) References Cited

U.S. PATENT DOCUMENTS

| | | | |
|---|---|---|---|
| 2016/0131742 A1* | 5/2016 | Schoor | G01S 13/931 342/128 |
| 2016/0223643 A1 | 8/2016 | Li et al. | |
| 2016/0223645 A1 | 8/2016 | Kim | |
| 2017/0307729 A1* | 10/2017 | Eshraghi | G01S 7/2813 |

FOREIGN PATENT DOCUMENTS

| | | | | |
|---|---|---|---|---|
| DE | 102013212090 A1 | 1/2015 | | |
| DE | 102017223429 A1 | 7/2018 | | |
| EP | 2463683 A1 | 6/2012 | | |
| EP | 3056920 A1 | 8/2016 | | |
| JP | 2008298736 A | 12/2008 | | |
| JP | 2010203918 A | 9/2010 | | |
| JP | 2012512387 A | 5/2012 | | |
| JP | 2016029369 A | 3/2016 | | |
| RU | 2005130275 A | * | 4/2007 | ............. Y02A 90/10 |

* cited by examiner

METHOD AND DEVICE FOR OPERATING MULTIPLE SENSORS OF A VEHICLE

FIELD

The present invention relates to a method and to a device for operating multiple sensors of a vehicle in at least partially spatially coinciding detection areas and in a shared frequency domain.

BACKGROUND INFORMATION

If a sensor is able to receive an external signal or its external echo sent by an external sensor, this external signal or external echo may superimpose or interfere with a signal or echo of the sensor. To avoid interferences, the frequency spectrum of the electromagnetic waves is divided into frequency bands and the frequency bands are divided into channels. Sensors of a vehicle may be operated in parallel on different channels. In order to operate multiple sensors of the vehicle on the same channel, the sensors may be oriented in such a way that their detection ranges are situated on different sides of the vehicle or are oriented in different directions. The sensors may also transmit in succession. In this case, one sensor starts to transmit when the preceding sensor is finished with its modulation.

SUMMARY

In accordance with the present invention, a method and a device for operating multiple sensors of a vehicle in at least partially spatially coinciding detection areas and in a shared frequency domain, as well as finally a corresponding computer program are provided. Advantageous refinements of and improvements on example embodiments of the present invention described herein result from the description herein and the figures.

Specific embodiments of the present invention may advantageously allow multiple sensors to operate in the same detection area or in overlapping detection areas in the same frequency band or in the same frequency domain, without only one of the sensors each being allowed to operate.

In this case, it is possible to operate multiple sensors having overlapping detection areas simultaneously without disruptive interferences. The sensor signals are transmitted and received in a nested manner. Thus, the potential frequency domain may be utilized and a cycle time including a modulation time required for processing the sensor signals may be filled.

In accordance with an example embodiment of the present invention, a method is provided for operating multiple sensors of a vehicle in at least partially spatially coinciding detection areas and in a shared frequency domain, which is characterized in that at one transmission point in time at least two of the sensors simultaneously transmit at instantaneous frequencies separated by a frequency gap, the frequency gap including at least one instantaneous receive bandwidth of the sensors, each instantaneous frequency being blocked for use by the sensors, after the transmission point in time, for the duration of a time gap, the time gap including at least one signal propagation time across a reception range of the sensors.

Specific embodiments of the present invention may be considered to be based, among other things, on the concepts and findings described below.

A sensor may be an active sensor, which emits a signal and receives reflected echoes of the signal. The signal may be an acoustic signal or an electromagnetic signal, such as a light signal or a radio signal. In particular, the signal may be a radar signal. A distance to a reflecting object may be determined over a propagation time between the emitting and the receiving. A relative speed of the object to the sensor may be determined via a frequency shift of the echo relative to the signal. A direction to the object may be determined via a propagation time difference. The sensors may be identical. The sensors are operated in a synchronized manner. The sensors may emit signals in a shared frequency domain. The frequency domain is a section of a potential operating area of the sensors. The frequency domain is determined by an upper limit frequency and a lower limit frequency. The frequency domain includes a bandwidth of frequencies provided for use. An instantaneous frequency is a frequency of the frequency domain emitted momentarily or occupied by the sensor. The instantaneous frequency is adjustable. A frequency gap is a frequency spacing between two instantaneous frequencies minimally required for separating two signals. The frequency gap to be minimally adhered to between two simultaneously emitted instantaneous frequencies is determined by reception properties of the two simultaneously emitting sensors. While one sensor is tuned to one instantaneous frequency, it is able to receive frequencies with one receive bandwidth. The present instantaneous frequency in a two-sided band receiver may be situated centrally in the receive bandwidth. As a result, the frequency gap includes at least the one half of the frequencies of the receive bandwidth of the one sensor and the other half of the frequencies of the receive bandwidth of the other sensor. In a one-sided bandwidth receiver, the present instantaneous frequency may alternatively be situated at the edge of the receive bandwidth. As a result, the frequency gap includes at least the entire receive bandwidth of one sensor. A time gap is a minimum time interval between two transmission points in time on the same frequency. The time gap is thus a time interval, which must be maintained at least until emission takes place again on one frequency. Echoes are received on the frequency during the time gap. The time gap is at least long enough for the signal to be able to reach an object in a reception range and the echo of the signal reflected on the object is able to reach the sensor again. Thus, the time gap is at least twice as long as the product of the reception range and a propagation speed of the signal. A maximum possible value of the reception range is determined by a maximum transmission power and a reception sensitivity of the sensor. A value used may be lower than the maximum value.

One of the sensors is able to modulate in one frequency sub-band of the frequency domain for a partial modulation time period. All frequencies of the frequency sub-band may be transmitted as an instantaneous frequency at least once within the partial modulation time period. The frequency domain may be subdivided into multiple frequency ranges, so-called frequency sub-bands. A frequency sub-band may be assigned to a sensor for a predetermined time period, the so-called partial modulation time period. For the partial modulation time period, the instantaneous frequency within the frequency sub-band may be adjusted or modulated.

The sensor may transmit sequentially in different frequency sub-bands over a total modulation time period that includes multiple partial modulation time periods. The frequency sub-bands of a total modulation time period may cover at least a majority of all frequencies contained in the frequency domain. The frequency sub-bands may, in particular, cover the entire frequency domain. The frequencies of the frequency domain may thus be processed piece by piece. In the process, other sensors may each use simultaneously the free frequency sub-bands.

The frequency sub-bands of the total modulation time period may at least partially overlap. The overlapping frequencies in this case are transmitted multiple times in one total modulation time period. These frequencies are therefore frequently scanned.

The sensors transmitting at one transmission point in time may transmit in different non-overlapping frequency sub-bands. Alternatively, at least two of the sensors transmitting at one transmission point in time may transmit in at least partially overlapping frequency sub-bands or in the same frequency sub-band. Thus, one sensor may transmit per frequency sub-band or multiple sensors may modulate within one frequency sub-band. Multiple sensors may be operated within a shared partial modulation time period. These sensors then transmit the same frequency offset by at least the time gap. By using multiple sensors in the same frequency sub-band, it is possible to achieve a particularly tight nesting. With the simultaneous use of different frequency sub-bands, it is possible to efficiently utilize the available frequency domain.

Two adjacent frequency sub-bands may be spaced apart from one another by a buffer frequency band. A buffer frequency band between two frequency sub-bands offers an additional frequency spacing. In this way, a reliable separation of the simultaneously transmitting signals and echoes may be achieved. The frequencies of the buffer frequency band may be contained in a frequency sub-band, which is used chronologically subsequently and which overlaps the two adjacent frequency sub-bands.

The sensor may transmit within one partial modulation time period at least one frequency ramp that sweeps the frequency sub-band. A frequency ramp may have a predetermined gradient. The frequency ramp may be transmitted in a rising or falling manner. Successive frequency ramps may have different gradients. The frequency range of the frequency sub-band results in a maximum possible transmission duration of an instantaneous frequency. The frequency ramp may be made up of a plurality of successive transmission points in time, each having a different instantaneous frequency.

The partial modulation time periods of the sensors transmitting at one transmission point in time may begin with a time delay. As a result of the offset, it is possible to achieve a nesting of the sensors.

The example method may, for example, be implemented in software or in hardware or in a mixed form made up of software and hardware, for example, in a control unit.

The approach presented herein further provides an example device, which is designed to carry out, activate or implement the steps of a variant of the method described herein in corresponding units.

The device may be an electrical device including at least one processing unit for processing signals or data, at least one memory unit for storing signals or data and/or at least one interface and/or a communication interface for reading in or outputting data, which are embedded in a communication protocol. The processing unit may, for example, be a signal processor, a so-called system ASIC or a microcontroller for processing sensor signals and for outputting data signals as a function of the sensor signals. The memory unit may, for example, be a flash memory, an EPROM or a magnetic memory unit. The interface may be designed as a sensor interface for reading in the sensor signals from a sensor and/or as an actuator interface for outputting data signals and/or control signals to an actuator. The communication interface may be designed to read in or output the data wirelessly and/or in a hardwired manner. The interfaces may also be software modules, which are present, for example, on a microcontroller alongside other software modules.

Also advantageous is a computer program product or computer program having program code, which may be stored on a machine-readable medium or memory medium, such as a semiconductor memory, a hard disk memory or an optical memory, and which is used for carrying out, implementing and/or activating steps of the method according to one of the previously described specific embodiments, in particular, when the program product or program is executed on a computer or a device.

It is noted that some of the possible features and advantages of the present invention herein are described with reference to different specific embodiments as method and device. Those skilled in the art recognize that the features may be combined, adapted or interchanged in a suitable manner in order to arrive at additional specific embodiments of the present invention.

BRIEF DESCRIPTION OF THE DRAWINGS

Specific embodiments of the present invention are described below with reference to the figures; neither the figures nor the description herein are to be interpreted as limiting to the present invention.

The figures are merely schematic and not true to scale. Identical reference numerals in the figures refer to identical or identically acting features.

DETAILED DESCRIPTION OF EXAMPLE EMBODIMENTS

Prior to explaining details of specific embodiments of the present invention with reference to the figures, different aspects with regard to the approach presented herein and to potential variants of the approach will be explained, in part using wording which, is for the sake of easier understanding.

The approach presented herein provides an example method for the synchronization of multiple radar sensors in a network of sensors. This results in a reduction in the mutual interference of multiple sensors in a vehicle.

The increasing upgrade of vehicles with numerous radar sensors increases the likelihood of interference occurring between the individual sensors. In particular, if the field of vision of the sensors overlaps and the modulation time relative to the processing time or cycle time increases. Interference in this case occurs as a result of reflections on objects located in the field of vision of multiple sensors and on which the reflected output of individual sensors is superimposed.

To avoid this, the sensors may be modulated successively so that the modulation times do not overlap. In this case, only so many sensors may be synchronized as a multiple of the modulation time fits into the cycle time.

Since the ratio between the modulation time and the cycle time increases due to faster processors and less heat generation, only few, i.e., one to two, sensors may be synchronized in an interference-free manner by synchronizing the modulation times.

The example method presented herein expands the possibility of synchronizing sensors in an interference-free manner.

The approach presented herein is based on the fact that in the linear modulations presently used in the automotive sector, the complete bandwidth is not occupied at any one time. As a result, it is possible to synchronize multiple sensors in a nested manner. The number of sensors synchronizable in an interference-free manner may be significantly increased according to the form of the modulation.

The example method described makes it possible, based on the properties of the modulation of automotive radar sensors, to synchronize multiple sensors in a vehicle in an interference-free manner. In the process, the number of sensors which may be synchronized in an interference-free manner may be increased.

In order to increase the number of synchronizable sensors in one measuring cycle, the start of the modulation may be nested in such a way that no overlap of the emitted ramps occurs.

Figure 1:
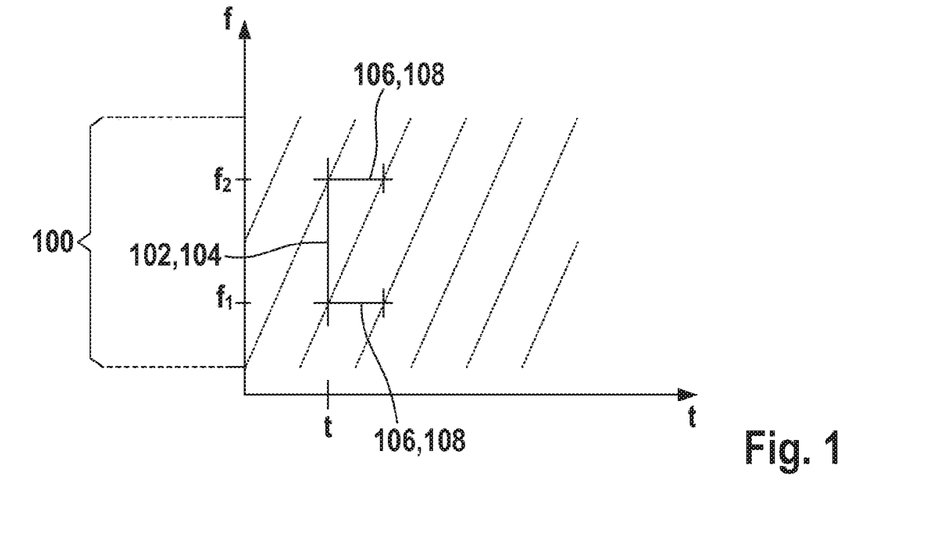
FIG. 1 shows a temporal representation of a frequency domain, in which multiple sensors are each active simultaneously according to one exemplary embodiment.

FIG. 1 shows a temporal representation of a frequency domain 100, in which multiple sensors are each active simultaneously according to one exemplary embodiment. The sensors in this case are radar sensors. Frequency domain 100 is therefore a small section of an electromagnetic spectrum. If the sensors are acoustic sensors, frequency domain 100 is a small section of an acoustic spectrum.

Frequency domain 100 may be referred to as a frequency band or as a section of a frequency band. The sensors are installed in a vehicle and have at least partially spatially coinciding detection areas, so that the sensors are able to receive signals and/or echoes of the other sensors. Distorted distance values result if one of the sensors receives an external signal or echo during the time it is ready to receive its own echo. At least two of the sensors transmit simultaneously at a transmission point in time t on instantaneous frequencies f1, f2 separated by a frequency gap 102.

Thus, frequency gap 102 is between instantaneous frequencies f1, f2 and includes at least one instantaneous receive bandwidth 104 of at least one of the sensors. Receive bandwidth 104 is therefore smaller than or equal in size to frequency gap 102. Receive bandwidth 104 in this case may include the upper half of the frequencies that the first sensor is able to receive while it is tuned to first instantaneous frequency f1, and may include the lower half of the frequencies that the second sensor is able to receive while it is tuned to second instantaneous frequency f2. Alternatively, frequency gap 102 may include entire receive bandwidth 104 of one of the sensors if this sensor is a single sideband receiver. If frequency gap 102 is larger than receive bandwidth 104, then the receivable frequencies are spaced apart from one another by intermediate, non-receivable frequencies.

After transmission point in time t, each instantaneous frequency f1, f2 used is blocked for a use by the sensors for the duration of a time gap 106. Time gap 106 includes at least one signal propagation time 108 across a reception range of the sensors. Thus, signal propagation time 108 is shorter or equal in length to time gap 106. Maximum signal propagation time 108 is determined by the weakest signal or echo evaluatable by the sensors. In this case, signal propagation time 108 may become greater with increasing transmission power and/or increasing sensitivity of the sensors. Signal propagation time 108 may also be limited by a desired size of the detection area if objects outside the detection area are not to be detected. Signals and echoes below a minimum signal strength may also be suppressed.

The sensors are operated in a modulated manner within frequency domain 100. In this case, the sensors transmit at temporal sequential transmission points in time on different instantaneous frequencies. In the process, at least the rules described above are observed in each case.

Figure 2:
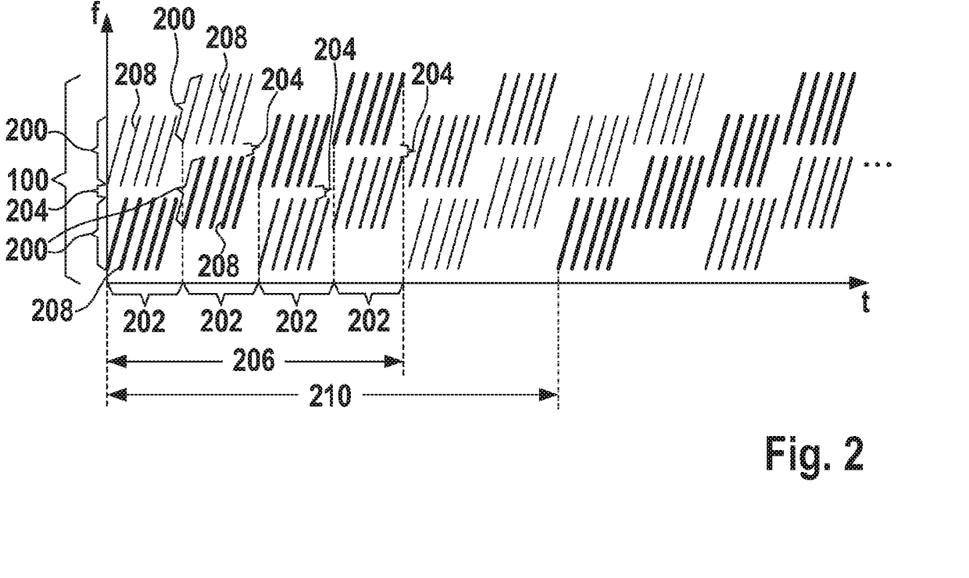
FIG. 2 shows a representation of a synchronization of at least two sensors in the same frequency domain according to one exemplary embodiment.

FIG. 2 shows a representation of a synchronization of at least two sensors in the same frequency domain 100 according to the approach presented herein. The synchronization takes place essentially as in FIG. 1. By contrast, frequency domain 100 is divided here into at least four partially overlapping frequency sub-bands 200. For one partial modulation time period 202, one sensor each in this exemplary embodiment transmits its signal in one of frequency sub-bands 200. Transmission takes place in parallel in at least two of frequency sub-bands 200. In this case, at least two sensors each transmit on instantaneous frequencies separated by at least the frequency gap at one transmission point in time. An instantaneous frequency here is in each case a component of one of frequency sub-bands 200. Once a transmission has taken place on an instantaneous frequency, the respective instantaneous frequency is not used for at least the duration of the time gap.

Frequency sub-bands 200 used are each spaced apart from one another by a buffer frequency band 204. The sensors transmit in different frequency sub-bands 200 in successive partial modulation time periods 202. A sensor transmits at least once in all frequency sub-bands 200 within one total modulation time period 206. Thus, within total modulation time period 206, the sensor transmits at least once on at least a majority of all frequencies of frequency domain 100. In the example depicted herein, total modulation time period 206 is four times as long as partial modulation time period 202.

Partial modulation time period 202 in this case is so long that the sensor transmits five immediately successive frequency ramps 208 within partial modulation time period 202. Frequency ramps 208 may be transmitted in a rising and/or falling manner. Frequency ramps 208 are offset relative to one another in each case by the time gap within one partial modulation time period 202. A frequency sub-band 200 in this case is at least as wide as the receive bandwidth. In this way, next frequency ramp 208 starts immediately after the end of preceding frequency ramp 208. Due to buffer frequency band 204 and the frequency range of the frequency sub-band, the frequency gap between two instantaneous frequencies is greater than the receive bandwidth.

In one exemplary embodiment of the present invention, three sensors are operated in a nested and synchronized manner using the approach presented herein. In this approach, always two of the sensors transmit in two different frequency sub-bands 200 that do not overlap due to buffer frequency bands 204. Once one of the sensors has transmitted at least once for total modulation time period 206 essentially on all frequencies of frequency domain 100, it does not transmit for two partial modulation time periods 202, since a cycle time duration 210 includes six partial modulation time periods 202. The three sensors begin their total modulation time periods 206 in each case offset by two partial modulation time periods 202. Thus, two of total modulation time periods 202 each overlap by two sub-modulations time periods 202.

One possible variation is shown in FIG. 2. In this variant of the modulation, the ramps are divided into blocks, one block sweeping only one portion of the utilized bandwidth. Due to the type of modulation, it is possible for multiple sensors to be started in succession without the individual ramps or blocks overlapping in the frequency range. The number of sensors in this case is a function of the parameters of the modulation, but is nevertheless greater than when the second sensor is started only after the end of the modulation of the first sensor. In the form of modulation shown, it would conventionally not be possible to synchronize any two sensors due to the ratio of the modulation time to the cycle time (>0.5). As a result of the nesting, however, it is possible to synchronize three sensors in an interference-free manner.

Figure 3:
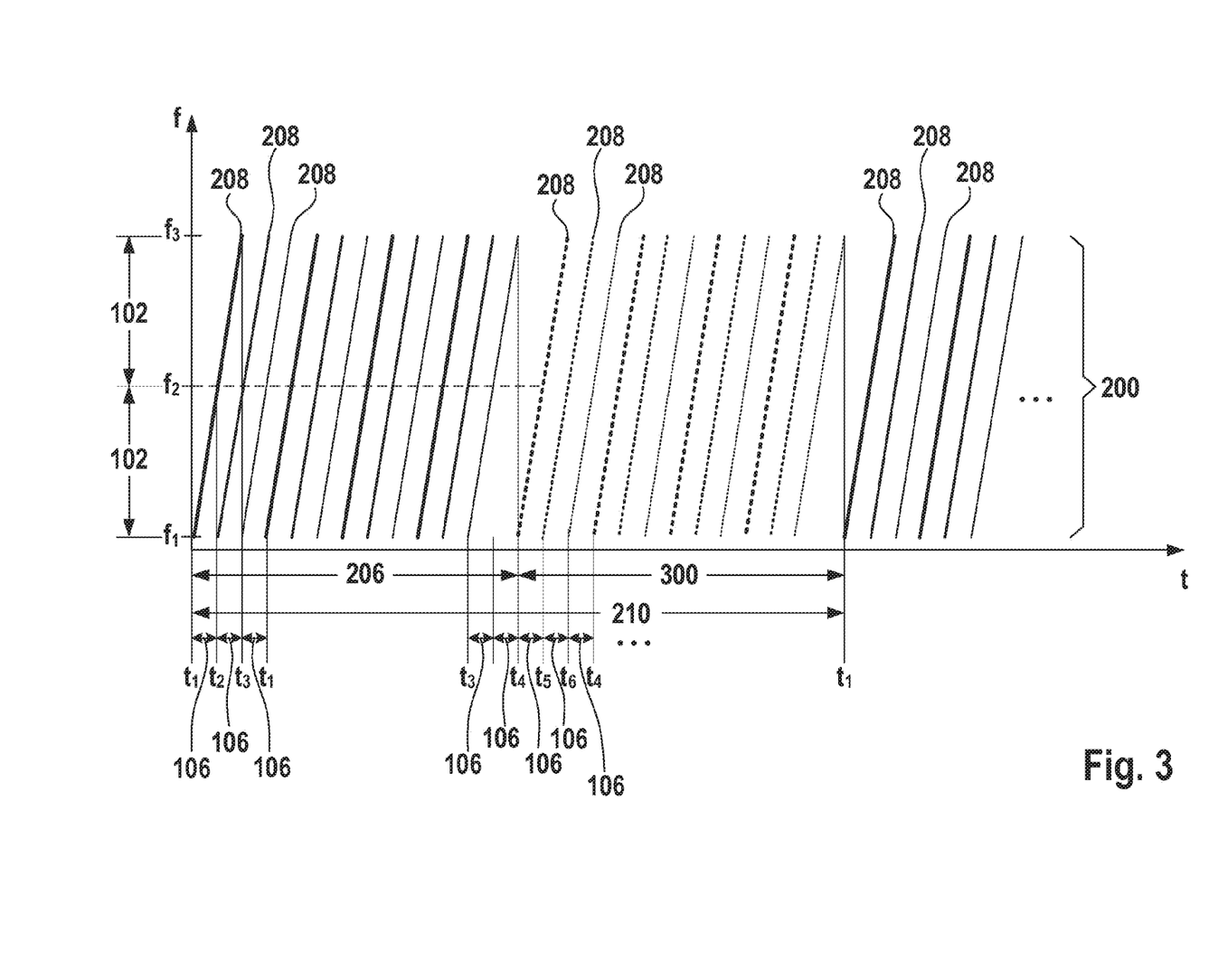
FIG. 3 shows a representation of a synchronization of a plurality of sensors according to one exemplary embodiment.

FIG. 3 shows a representation of a synchronization of a plurality of sensors according to one exemplary embodiment. The synchronization takes place essentially as in FIG. 1. By contrast, the sensors transmit frequency ramps 208 here as in FIG. 2. Here, a group made up of three sensors is synchronized within one cycle time period 210. Frequency ramps 208 of the group are transmitted as closely as possible in a nested manner to the three sensors within total modulation time period 206.

Here, a first one of the sensors begins to transmit a first first frequency ramp 208 at a first first transmission point in time t1 at first instantaneous frequency f1 at the beginning of total modulation time period 206. A second one of the sensors begins to transmit a first second frequency ramp 208 at a first second transmission point in time t2 offset by time gap 106, also at first instantaneous frequency f1. The first sensor has reached second instantaneous frequency f2 offset by frequency gap 102 on its first first frequency ramp 208 at first second transmission point in time t2. At a first third transmission point in time t3 offset to first second transmission point in time t2 by time gap 106, a third one of the sensors starts its first third frequency ramp 208 at first instantaneous frequency f1. At first third transmission point in time t3, the second sensor has reached second instantaneous frequency f2 on its first second frequency ramp 208. The first sensor transmits at first third transmission point in time t3 on its first first frequency ramp 208 on a third instantaneous frequency f3 spaced apart relative to second instantaneous frequency f2 by frequency gap 102.

In the exemplary embodiment depicted herein, first first frequency ramp 208 ends when third instantaneous frequency f3 is reached. The first sensor subsequently pauses for the duration of a time gap 106 in order to begin the sequence of frequency ramps 208 again at a second first transmission point in time t1. The sequence of first, second and third frequency ramps 208 are repeated here four times within total modulation time period 206. Once total modulation time period 206 has elapsed, the sensors pause until the end of cycle time period 210.

In one exemplary embodiment of the present invention, a further total modulation time period 300 begins after total modulation time period 206 has elapsed. In further total modulation time period 300, a further group made up of three sensors is synchronized. At the start of further total modulation time period 300, a fourth one of the sensors begins its first fourth frequency ramp 208 at a first fourth transmission point in time t4 at first instantaneous frequency f1. A fifth one of the sensors begins a first fifth frequency ramp 208 at a first fifth transmission point in time t5 offset by a time gap 106, also at first instantaneous frequency f1. Time gaps 106 may be of varying length. The fourth sensor has reached second instantaneous frequency f2 on its first fourth frequency ramp 208 at first fifth transmission point in time t5. At a first sixth transmission point in time t6 offset to first fifth transmission point in time t5 by time gap 106, a sixth one of the sensors starts its first sixth frequency ramp 208 at first instantaneous frequency f1. At first sixth transmission point in time t6, the fifth sensor has reached second instantaneous frequency f2 on its first fifth frequency ramp 208. The fourth sensor has reached third instantaneous frequency f3 on its first fourth frequency ramp 208 at first sixth transmission point in time t6.

First fourth frequency ramp 208 ends here also when third instantaneous frequency f3 is reached. The fourth sensor subsequently pauses for the duration of a time gap 106 in order to begin the sequence of frequency ramps 208 again at a second fourth transmission point in time t4. The sequence of fourth, fifth and sixth frequency ramps 208 is also repeated four times within further total modulation time period 300.

Once cycle time period 210 has elapsed, the sequence begins again with a first first frequency ramp 208 of the first sensor at a first first transmission point in time t1 and at first instantaneous frequency f1.

In one exemplary embodiment of the present invention, FIG. 3 shows a detail of a modulation as in FIG. 2. In this detail, a frequency range of frequency ramps 208 corresponds to a frequency range of one of frequency sub-bands 200. The full frequency domain is not depicted and, as in FIG. 2, includes at least one further frequency sub-band having higher or lower frequencies. The further frequency sub-band may be situated above or below frequency sub-band 200 depicted herein with or without a frequency space as a result of the buffer frequency band. No overlap by further frequency sub-bands is required as in FIG. 2, if the further frequency sub-band directly connects at the higher or lower frequencies.

Total modulation time period 206 for transmitting first, second, and third frequency ramps 208 corresponds in this case to a partial modulation time period 202, as in FIG. 2. Further total modulation time period 300 for transmitting fourth, fifth, and sixth frequency ramps 208 corresponds to a further partial modulation time period 202. At least two cycle time periods 210 are then required in order to transmit at least once on a majority of all frequencies of the frequency band.

In other words, FIGS. 2 and 3 show signal profiles of multiple sensors of a vehicle, which are operated in a shared frequency domain. The sensors are operated in a modulated manner in frequency ramps 208 and include at least partially spatially overlapping detection areas. In the approach presented herein, a first one of the sensors transmits on a first instantaneous frequency f1 of a first frequency ramp 208, while at least a second one of the sensors transmits simultaneously on a second instantaneous frequency f2 of a second frequency ramp 208. First instantaneous frequency f1 and second instantaneous frequency f2 are spaced apart from one another at least by frequency gap 102.

The same instantaneous frequency f1 contained in two successive frequency ramps 208 is transmitted offset at least by time gap 106.

At the same time, at least two frequency ramps 208 are modulated. Instantaneous frequencies f1, f2 of frequency ramps 208 are spaced apart from one another at least by frequency gap 102. An instantaneous frequency f1 contained in two successive frequency ramps 208 is emitted time-delayed by at least time gap 106.

A further possible variation is shown in FIG. 3. In this variant, a nesting of individual ramps of various sensors takes place, which occupy, for example, the entire available bandwidth. In this variant, the ramps of the sensors are nested in such a way that they do not overlap. The times between the sensors in this case are selected in such a way that the reflections of remote objects do not fall within the field of vision of another sensor. In this method, it is possible to nest additional sensors in the pause between the end of the modulation and the start of the new cycle. In this type of synchronization, the sensors are tuned to one another in a temporally finer grid than in the variant described above.

With different variation options of the modulation, it is possible to also utilize mixed forms of both variants for the synchronization. The decisive advantage is that with the approach presented herein, a preferably large number of sensors synchronizable in an interference-free manner result. The sensors may be operated with linear ramps and with the same modulation of the synchronized sensors.

Figure 4:
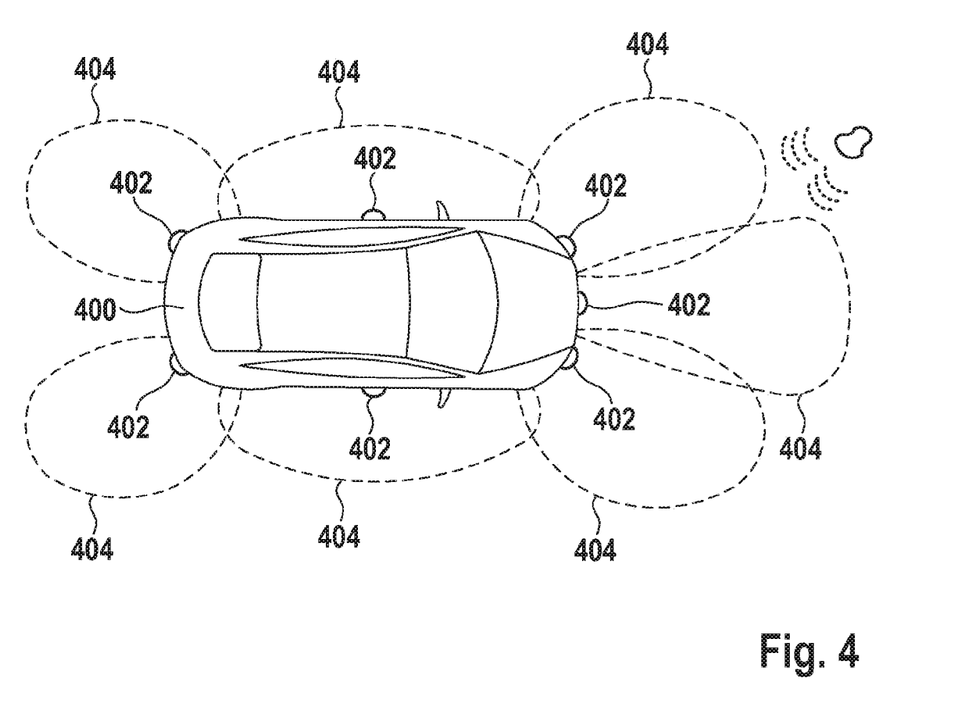
FIG. 4 shows a representation of a vehicle including multiple sensors and overlapping detection areas.

FIG. 4 shows a representation of a vehicle 400 including multiple sensors 402 and overlapping detection areas 404. Vehicle 400 in this case includes seven active sensors 402, which transmit in the same frequency domain. Vehicle 400 may include additional active sensors, which transmit in other frequency ranges of the electromagnetic spectrum. Vehicle 400 may also include passive sensors.

The front area of vehicle 400 includes three sensors 402, one sensor each on the sides and two sensors in the rear end area. At least two of detection areas 404 each at least partially overlap. Two sensors 402 immediately adjacent to one another having overlapping detection areas 404 transmit in the approach presented herein at different transmission points in time as described in the preceding figures, which are offset to one another by at least the time gap and/or at different instantaneous frequencies, which are spaced apart from one another by at least the frequency gap.

Sensors 402 having non-overlapping detection areas 404 such as, for example, front center sensor 402 and side sensors 402, may transmit at the same transmission point in time at the same instantaneous frequency. Sensors 402 oriented in the opposite direction on vehicle 400 such as, for example, front right sensor 402 and rear left sensor 402 or front left sensor 402 and rear right sensor 402 may also transmit at the same transmission point in time at the same instantaneous frequency.

Sensors 402, which have no overlapping field of vision or a very small overlapping field of vision, i.e., sensors 402, which are installed, for example, front left and right rear in vehicle 400, may also be operated in parallel.

In other words, it is shown by way of example in FIG. 4 how sensors 402 in a vehicle 400 may be synchronized using the method presented herein. In this case, seven sensors 402 are synchronized with the aid of three synchronization points in time. As is apparent from the figure, a significantly greater number of sensors 402 having overlapping fields of vision may be operated in an interference-free manner in vehicle 400 due to the expansion of the synchronization possibilities.

Finally, it is noted that terms such as "having," "including," etc., do not exclude other elements or steps and terms such as "one" do not exclude a plurality.

What is claimed is:

1. A method for operating multiple sensors of a vehicle in at least partially spatially coinciding detection areas and in a shared frequency domain, the method comprising:
   simultaneously transmitting, by at least two sensors, at a transmission point in time on respective instantaneous frequencies separated by a frequency gap, the frequency gap including at least one instantaneous receive bandwidth of the sensors; and
   subsequently blocking each of the respective instantaneous frequencies for a use by the sensors after the transmission point in time for a duration of a time gap, the time gap including at least one signal propagation time across a reception range of the sensors, so that the signal propagation time is shorter or equal in length to the time gap;
   wherein the frequency domain is divided into at least partially overlapping frequency sub-bands, wherein for one partial modulation time period, one of each of the sensors transmits its signal in one of the frequency sub-bands, wherein transmission takes place in parallel in at least two of the frequency sub-bands, wherein at least two of the sensors each transmit on instantaneous frequencies separated by at least the frequency gap at the transmission point in time, wherein an instantaneous frequency is in each case a component of one of the frequency sub-bands, and wherein when a transmission has taken place on the instantaneous frequency, a respective instantaneous frequency is not used for at least a duration of the time gap.

2. The method as recited in claim 1, wherein one of the sensors modulates for a partial modulation time period in a frequency sub-band of the frequency domain, all frequencies of the frequency sub-band being transmitted at least once as the respective instantaneous frequency of the one of the sensors within the partial modulation time period.

3. The method as recited in claim 2, wherein the one of the sensors transmits sequentially in different frequency sub-bands over a total modulation time period including multiple partial modulation time periods, the frequency sub-bands of the total modulation time period covering at least a majority of all frequencies contained in the frequency domain.

4. The method as recited in claim 3, wherein the frequency sub-bands of the total modulation time period at least partially overlap.

5. The method as recited in claim 2, wherein the sensors transmitting at the transmission point in time transmit in different overlap-free frequency sub-bands.

6. The method as recited in claim 2, wherein at least two of the sensors transmitting at the transmission point in time transmit in at least partially overlapping frequency sub-bands.

7. The method as recited in claim 2, wherein two adjacent frequency sub-bands of the frequency domain are spaced apart from one another by a buffer frequency band.

8. The method as recited in claim 2, wherein the one of the sensors transmits within one partial modulation time period at least one frequency ramp sweeping the frequency sub-band.

9. The method as recited in claim 2, wherein the partial modulation time period of the one of the sensors transmitting at the transmission point in time begins with a time delay.

10. An apparatus for operating multiple sensors of a vehicle in at least partially spatially coinciding detection areas and in a shared frequency domain, comprising:
    a device being configured to perform the following:
        simultaneously transmitting, by at least two sensors, at a transmission point in time on respective instantaneous frequencies separated by a frequency gap, the frequency gap including at least one instantaneous receive bandwidth of the sensors; and subsequent blocking each of the respective instantaneous frequencies for a use by the sensors after the transmission point in time for a duration of a time gap, the time gap including at least one signal propagation time across a reception range of the sensors;

wherein the frequency domain is divided into at least partially overlapping frequency sub-bands, wherein for one partial modulation time period, one of each of the sensors transmits its signal in one of the frequency sub-bands, wherein transmission takes place in parallel in at least two of the frequency sub-bands, wherein at least two of the sensors each transmit on instantaneous frequencies separated by at least the frequency gap at the transmission point in time, wherein an instantaneous frequency is in each case a component of one of the frequency sub-bands, and wherein when a transmission has taken place on the instantaneous frequency, a respective instantaneous frequency is not used for at least a duration of the time gap.

11. A non-transitory machine-readable memory medium, on which is stored a computer program, which is executable by a processor, comprising:

a program code arrangement having program code for operating multiple sensors of a vehicle in at least partially spatially coinciding detection areas and in a shared frequency domain, by performing the following:

simultaneously transmitting, by at least two sensors, at a transmission point in time on respective instantaneous frequencies separated by a frequency gap, the frequency gap including at least one instantaneous receive bandwidth of the sensors; and subsequently blocking each of the respective instantaneous frequencies for a use by the sensors after the transmission point in time for a duration of a time gap, the time gap including at least one signal propagation time across a reception range of the sensors;

wherein the frequency domain is divided into at least partially overlapping frequency sub-bands, wherein for one partial modulation time period, one of each of the sensors transmits its signal in one of the frequency sub-bands, wherein transmission takes place in parallel in at least two of the frequency sub-bands, wherein at least two of the sensors each transmit on instantaneous frequencies separated by at least the frequency gap at the transmission point in time, wherein an instantaneous frequency is in each case a component of one of the frequency sub-bands, and wherein when a transmission has taken place on the instantaneous frequency, a respective instantaneous frequency is not used for at least a duration of the time gap.

* * * * *